US012790268B2

(12) United States Patent
Zelepouga et al.

(10) Patent No.: US 12,790,268 B2
(45) Date of Patent: Nov. 10, 2026

(54) METHOD AND APPARATUS FOR FILTRATION COMBUSTION

(71) Applicant: Furno Materials, Inc., Mountain View, CA (US)

(72) Inventors: Serguei Zelepouga, Charlotte, NC (US); Beck Goodloe, Golden, CO (US); Gurinder Nagra, Palo Alto, CA (US)

(73) Assignee: Furno Materials, Inc., South San Francisco, CA (US)

( * ) Notice: Subject to any disclaimer, the term of this patent is extended or adjusted under 35 U.S.C. 154(b) by 320 days.

(21) Appl. No.: 18/356,175

(22) Filed: Jul. 20, 2023

(65) Prior Publication Data

US 2024/0025806 A1 Jan. 25, 2024

Related U.S. Application Data

(60) Provisional application No. 63/391,632, filed on Jul. 22, 2022.

(51) Int. Cl.
*C04B 7/44* (2006.01)
*C04B 7/43* (2006.01)
*F27B 1/00* (2006.01)

(52) U.S. Cl.
CPC ............ *C04B 7/4469* (2013.01); *C04B 7/434* (2013.01); *C04B 7/4407* (2013.01); *F27B 1/005* (2013.01); *F27M 2003/03* (2013.01)

(58) Field of Classification Search
CPC ..... C04B 7/4469; C04B 7/434; C04B 7/4407; C04B 7/367; F27B 1/005; F27M 2003/03
See application file for complete search history.

(56) References Cited

U.S. PATENT DOCUMENTS 3,285,590 A 11/1966 Parsons
3,650,786 A 3/1972 Maravilla
3,881,862 A 5/1975 Nishida et al.
3,998,649 A * 12/1976 Gottlieb .................. C04B 7/432 106/771
4,682,948 A 7/1987 Cohen
5,118,288 A 6/1992 Litka et al.
5,536,167 A 7/1996 Yokota et al.
5,572,938 A 11/1996 Leger
5,853,474 A 12/1998 Hilton
(Continued)

FOREIGN PATENT DOCUMENTS

EP 2703369 3/2014
EP 3231779 A1 10/2017
(Continued)

OTHER PUBLICATIONS

WIKIPEDIA (clay shale quartz clinker) (Year: 2025).*
(Continued)

*Primary Examiner* — Pamela H Weiss
(74) *Attorney, Agent, or Firm* — Vedder Price P.C.

(57) ABSTRACT

A method of producing clinker includes placing a pre-clinker mixture comprising a source of CaO into a starting material feed port in a vertically-oriented reaction chamber of a vertical reactor. The method includes placing a gaseous combustion mixture into the combustion mixture inlet. The method includes combusting the gaseous combustion mixture within the vertical reactor to heat the pre-clinker mixture, release $CO_2$ therefrom, and form the clinker therefrom. The method also includes removing the clinker from the product exit port.

16 Claims, 4 Drawing Sheets

(56) References Cited

U.S. PATENT DOCUMENTS

| | | | |
|---|---|---|---|
| 7,037,368 B2 | 5/2006 | Hoffis | |
| 7,434,332 B2 | 10/2008 | Morton et al. | |
| 8,114,214 B2 | 2/2012 | Constantz et al. | |
| 8,470,275 B2 | 6/2013 | Constantz et al. | |
| 9,714,406 B2 | 7/2017 | Constantz et al. | |
| 11,204,198 B2 | 12/2021 | Dal | |
| 12,325,671 B2 * | 6/2025 | Nagra | F27B 1/20 |
| 2005/0274066 A1 | 12/2005 | Morton | |
| 2008/0233044 A1 * | 9/2008 | Hansen | C04B 7/364 422/162 |
| 2009/0305180 A1 | 12/2009 | Altfeld et al. | |
| 2010/0326924 A1 | 12/2010 | Georgiou et al. | |
| 2011/0033239 A1 | 2/2011 | Constantz | |
| 2014/0130498 A1 | 5/2014 | Randolph | |
| 2015/0010357 A1 | 1/2015 | De Koeijer et al. | |
| 2016/0251560 A1 | 9/2016 | Pober | |
| 2019/0144339 A1 | 5/2019 | Bullerjahn et al. | |
| 2022/0153640 A1 | 5/2022 | Nagra | |
| 2022/0364441 A1 | 11/2022 | Nagra et al. | |
| 2022/0411327 A1 * | 12/2022 | Dossing | C04B 7/527 |
| 2023/0366297 A1 | 11/2023 | Anderson et al. | |

FOREIGN PATENT DOCUMENTS

| | | |
|---|---|---|
| WO | 2018146179 A1 | 8/2018 |
| WO | 2022020780 A1 | 1/2022 |
| WO | 2022076931 A1 | 4/2022 |
| WO | 2022187290 A1 | 9/2022 |
| WO | 2024020515 | 4/2024 |

OTHER PUBLICATIONS

Bingue, Jacques P, et al., “Hydrogen sulfide filtration combustion: comparison of theory and experiment”, Experimental Thermal and Fluid Science 26, (2002), 7 pgs.

Kirdyashkin, Alexander, et al., “Ceramic sintering furnace based on combustion of premixed natural gas in porous inert media”, Fuel 309, (2022), 13 pgs.

Toledo, Mario, et al., “Comparative study of lean and rich filtration combustion of methane/air, ethane/air, and propane/air mixtures”, Proceedings of the 4th WSEAS Int. Conf on Heat Transfer, Thermal Engineering and Environment, (Aug. 2006), 7 pgs.

“International Application Serial No. PCT US2023 070644, International Search Report mailed Feb. 16, 2024”, 4 pgs.

“International Application Serial No. PCT US2023 070644, Written Opinion mailed Feb. 16, 2024”, 6 pgs.

“Application Serial No. PCT US2023 070644, Invitation to Pay Additional Fees mailed Oct. 31, 2023”, 2 pgs.

Extended European Search Report from European Patent Office, dated Jun. 3, 2026, filed under European Patent Application No. 23843901.2, 8 pages.

* cited by examiner

METHOD AND APPARATUS FOR FILTRATION COMBUSTION

CROSS-REFERENCE TO RELATED APPLICATION

This application claims the benefit of priority to U.S. Provisional Patent Application Ser. No. 63/391,632 filed Jul. 22, 2022, the disclosure of which is incorporated herein in its entirety by reference.

BACKGROUND

The cement manufacturing remains one of the most energy intensive and $CO_2$ emitting industrial processes. Clinker burning is a well-established industrial process invented more than a century ago, with most modern clinker burning systems including a cyclone based preheating and calcining system, a rotary kiln where the calcined material is sintered at approximately 1450° C., and a clinker cooler. Over the last forty years, the efficiency of the rotary cement kilns has been gradually improving via separation of the raw meal calcination and clinkerization processes, gas bypass systems, waste heat recovery systems. In sum, segmentation of the process and optimization of each step has enabled incremental improvements in efficiency. However, this has come at the cost of scale and extra capital cost. Due to the large nature of current cement plants and technology, it is common for cement companies to build for peak capacity and often build over supply. As a result, local prices for cement fall and multi-regional cement companies' plants operate under-capacity at a loss. Thus, there has been a long-standing and unmet need for the ability to have incremental and capital-efficient deployment of cement production.

Furthermore, there are several long-standing and increasing business problems for the current cement industry, such as the increase in carbon regulations. This pressure from governments has created an increasing, but unmet, need for the cement industry to find low carbon low-cost pathways to reduce the carbon footprint of cement production.

Prior attempts at addressing these long standing and increasing problems of overcapacity and carbon footprint have largely failed to address these problems on a commercial scale, both technologically and economically. The reasons for these failures are many, to name a few necessary criteria, they do not present the combination of 1) a net-zero pathway for emissions, 2) low-cost cement production, 3) no regulatory hurdles (by producing Ordinary Portland Cement) and 4) modularity/adaptability.

Smaller scale vertical furnaces, on the order of 5 t/day to 200 t/day were common in the early $20^{th}$ century for cement manufacture. However, these prior smaller scale kilns had several problems, flaws, and drawbacks, such as limitations to solid fuels, lower operational efficiency, poor product quality, poor product consistency, and more emissions and higher operational cost compared to the modern large rotary kilns which produce 2000 t/day to 3,000 t/day. They were large producers of $CO_2$ and greenhouse gasses, and in particular, very large polluters, relative to their production rate. As such, they have not been widely used since the 1970's.

Vertical shaft kilns have been utilized for cement clinker manufacturing since the nineteenth century. However, because of the scaling, clinker quality, and air emissions control challenges, VSKs have not been widely utilized since 1970s.

SUMMARY OF THE INVENTION

Various aspects of the present invention provide a method of producing clinker. The method includes placing a pre-clinker mixture including a source of CaO into a starting material feed port in a reaction chamber of a vertical reactor. The vertical reactor includes a vertically-oriented longitudinal axis of the reaction chamber, a product exit port, a gaseous combustion mixture inlet into the reaction chamber, and one or more gas exhaust ports. The method includes placing a gaseous combustion mixture into the gaseous combustion mixture inlet. The method includes combusting the gaseous combustion mixture within the vertical reactor to heat the pre-clinker mixture, release $CO_2$ therefrom, and form the clinker therefrom. The method also includes removing the clinker from the product exit port.

Various aspects of the present invention provide a method of producing a product. The method includes placing a starting material mixture into a starting material feed port in a reaction chamber of a vertical reactor. The vertical reactor includes a vertically-oriented longitudinal axis of the reaction chamber, a product exit port in the reaction chamber, a gaseous combustion mixture inlet into the reaction chamber, and one or more gas exhaust ports in the reaction chamber. The method includes placing a gaseous combustion mixture into the gaseous combustion mixture inlet. The method includes combusting the gaseous combustion mixture within the vertical reactor to heat the starting material mixture and form the product therefrom. The method also includes removing the product from the product exit port.

Various aspects of the present invention provide an apparatus. The apparatus includes a reaction chamber including a vertically-oriented longitudinal axis. The apparatus includes a starting material feed port. The apparatus also includes a gaseous combustion mixture inlet into the reaction chamber for injecting the gaseous combustion mixture therein.

Porous media combustion is a fuel oxidation process in which a solid porous media within the combustor enables recuperation of the heat from the combustion products and preheating of incoming reactants. This internal heat recuperation extends the standard flammability limits and allows combustion of ultra-lean and ultra-rich fuel oxidizer mixtures. The porous media combustion research (mostly at the bench scale at universities) has been focused on hydrogen or syngas gas production, high efficiency water heating systems, VOC distraction, and/or heat sources for thermoelectric power generation.

Various aspects of the present invention are distinct from other methods and apparatuses for porous media combustion that use inert media. Conventional porous burner media combustion processes utilize an inert media to sustain combustion, such as alumina spheres or monolithic, porous foam. The present method and apparatus can sustain combustion in without any added inert media for sustaining combustion, such as an inert porous media or an inert burner media. The starting material mixture (e.g., pre-clinker mixture) and intermediates and products thereof in the reactor can sustain combustion within the reactor without application of an external heat source. In various aspects, the method of the present invention and apparatus for performing the same can provide product (e.g., clinker) at higher efficiency and at lower cost than conventional methods, such as compared to rotary kiln methods. In various aspects, the method and apparatus of the present invention can decrease or eliminate emission of pollutants generated by solid combustion mixtures (e.g., coal) used in conventional clinker-production processes.

In various aspects, the method and apparatus of the present invention can be used for a variety of processes and is not limited to clinker production. For example, the method and apparatus of the present invention can be used for calcining a source of CaO (e.g., $CaCO_3$) to produce lime, calcination for desorbing $CO_2$ from any carbonate rock in a direct air capture system, sintering of refractory materials, lithium production via spodumene, or direction reduction iron processing.

BRIEF DESCRIPTION OF THE FIGURES

The drawings illustrate generally, by way of example, but not by way of limitation, various aspects of the present invention.

DETAILED DESCRIPTION OF THE INVENTION

Figure 1A:
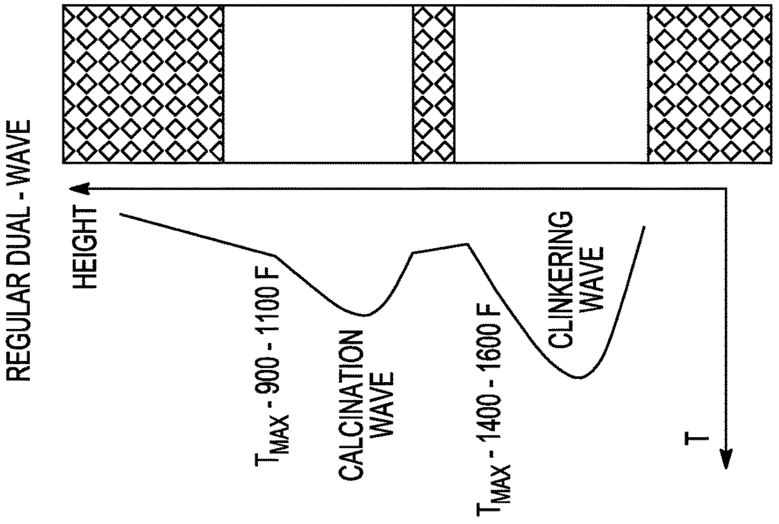
FIG. 1A illustrates a vertical reaction chamber that includes a calcination zone and a clinkering zone, in accordance with various aspects.

Reference will now be made in detail to certain aspects of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than or equal to about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Method of Producing Clinker.

Various aspects of the present invention provide a method of producing clinker. The method can include placing a pre-clinker mixture including a source of CaO into a starting material feed port in a reaction chamber of a vertical reactor, wherein the vertical reactor includes a vertically-oriented longitudinal axis of the reaction chamber, a product exit port, a gaseous combustion mixture inlet into the reaction chamber, and one or more gas exhaust ports. The method includes placing a gaseous combustion mixture into the gaseous combustion mixture inlet. The method includes combusting the gaseous combustion mixture within the vertical reactor to heat the pre-clinker mixture, release $CO_2$ therefrom, and form the clinker therefrom. The method also includes removing the clinker from the product exit port.

The vertical reactor can be a gravity-fed reactor. The vertically-oriented longitudinal axis of the reaction chamber can form an angle of 45° to 90° with a horizontal axis, or 70° to 90°, or 80° to 90°, or 85° to 90°. The starting material feed port can be located in any suitable portion of the reaction chamber, such as at a top or at a bottom portion of the reaction chamber. The one or more gas exhaust ports can be located in any suitable portion of the reaction chamber, such as at a top portion, an intermediate portion, a bottom portion, or a combination thereof. The product exit port can be located in any suitable portion of the reaction chamber, such as at a top portion of the reaction chamber or at a bottom portion of the reaction chamber.

The method of producing clinker is a method of filtration combustion. Filtration combustion can include superadiabatic combustion, non-superadiabatic combustion, or a combination thereof. Filtration combustion, also referred to as porous media combustion, is a method of partial or total oxidation of a fuel in the presence of a solid phase, such as wherein the solid phase and the fuel flow in a counter-current manner.

In various aspects, the method can include superadiabatically combusting the gaseous combustion mixture within the vertical reactor. As used herein, "superadiabatically combusting" the gaseous composition within the reactor means that the starting material mixture (e.g., pre-clinker mixture), intermediates formed therefrom, and/or products formed therefrom (e.g., clinker) attain a temperature in the reactor that exceeds the adiabatic flame temperature of the gaseous combustion mixture. The superadiabatic combustion of the gaseous combustion mixture is sufficient to sustain the combustion without the application of any external heat source to the reactor, such that internal heat recuperation is sufficient to sustain the combustion. An external heat source is a source of heat that is outside of the vertical reactor and/or reaction chamber, wherein the heat is transferred into the reaction chamber. An external heat source can include, for example, a burner, an electrical heater, and the like. The method can be free of external application of heat to the reaction chamber. In some embodiments, an initial application of external heat may be needed to initiate the combustion, but once initiated the combustion is self-sustaining in the absence of any external heat source. The superadiabatic combustion can occur on and/or in the pre-clinker mixture. The pre-clinker mixture can sustain the superadiabatic combustion at least by achieving a higher temperature than the adiabatic flame temperature of the gaseous combustion mixture in and/or on the pre-clinker mixture.

In other aspects, the method can combust the gaseous combustion mixture within the vertical reactor non-superadiabatically (e.g., sub-adiabatically) such that the starting material mixture (e.g., pre-clinker mixture), intermediates formed therefrom, and/or products formed therefrom (e.g., clinker), if measured in the absence of an external heat source, attain a temperature in the reactor that is equal to or less than the adiabatic flame temperature of the gaseous combustion mixture. The non-superadiabatic combustion of the gaseous combustion mixture is sufficient to sustain the combustion without the application of any external heat source to the reactor, such that internal heat recuperation is sufficient to sustain the combustion. The method can be free of external application of heat to the reaction chamber. In some embodiments, an initial application of external heat may be needed to initiate the non-superadiabatic combustion, but once initiated the combustion is self-sustaining in the absence of any external heat source. The non-superadiabatic combustion can occur on and/or in the pre-clinker mixture. The pre-clinker mixture can sustain the non-superadiabatic combustion at least by achieving a temperature that is high enough to maintain combustion of the gaseous combustion mixture without application of an external heat source.

The pre-clinker mixture includes a source of CaO. The source of CaO can include $CaCO_3$. The source of CaO can include limestone (such as inorganic or fossiliferous sedimentary limestone, metamorphic and igneous carbonate rock), calcium silicate mineral (such as wollastonite), and/or calcium aluminosilicates (such as slag or anorthite)). The pre-clinker mixture can include other sources of CaO. The pre-clinker mixture can further include $SiO_2$, $Al_2O_3$, $Fe_2O_3$, $SO_3$, MgO, $P_2O_5$, or a combination thereof. The pre-clinker mixture can optionally include impurities such as $Na_2O$, $K_2O$, $TiO_2$, oxides of Mn, oxides of Cr, and the like, or a combination thereof. The pre-clinker mixture can encompass raw pre-clinker materials and or calcined intermediate that are formed before clinker.

Conventional porous media combustion processes include the use of an inert porous burner media that achieves a high temperature and sustains combustion of a combustion composition without application of external heating. A unique feature of the present method and apparatus is that the combustion can occur in the absence of an added inert porous burner media. The method and apparatus can be free of added inert porous burner media, and can include placing only starting material mixture (e.g., pre-clinker mixture) and the gaseous combustion mixture into the reaction chamber. The starting material mixture, such as the pre-clinker mixture, and the intermediates and products thereof generated in the column as the starting material mixture is heated in the reaction chamber, serves the same function as a conventional inert porous burner media and sustains combustion in the reaction chamber without the application of external heat. The heat of the combustion can be absorbed by the starting material mixture, as well as intermediates and products formed therefrom, and/or walls of the reaction column, and the absorbed heat can be sufficient to preheat and sustain the combustion of incoming gaseous combustion mixture without the application of external heat.

The gaseous combustion mixture can be any suitable gaseous combustion mixture that can undergo sustained combustion in the reaction chamber in the absence of an external heat source. The gaseous combustion mixture can include a mixture of fuel and oxidizer (e.g., one or more fuels, and one or more oxidizers). The gaseous combustion mixture can be free of solid fuels. The reaction chamber can be free of solid fuels (e.g., can be free of coal or other conventional solid fuels for clinker production) other than the pre-clinker mixture. The gaseous combustion mixture can include a $C_1$-$C_5$ hydrocarbon, $H_2$, $O_2$, $N_2$, $CO_2$, CO, or a combination thereof. The gaseous combustion mixture can include $N_2$, $CO_2$, $O_2$, or a combination thereof. The gaseous combustion mixture can include biogas, syngas, another gaseous fuel, or a combination thereof. The gaseous combustion mixture can include air (e.g., 20.9% $O_2$ and balance $N_2$), oxygen enriched air (e.g., 21-50% $O_2$ and balance $N_2$), synthetic air (e.g., 20.9% $O_2$ and balance $CO_2$), oxygen depleted synthetic air (e.g., 17-20% $O_2$, balance $CO_2$), or oxygen enriched synthetic air (e.g., 21-50% $O_2$, balance $CO_2$), or a combination thereof. In some embodiments, the method can further include placing a solid fuel (e.g., coal) into the reaction chamber. In some embodiments, the method is free of a solid fuel in the reaction chamber in addition to the starting material mixture (e.g., the pre-clinker mixture).

The pre-clinker mixture can have any suitable physical form. The pre-clinker mixture can be particulate or pelletized. The pre-clinker mixture can have a particle size (e.g., number average of largest dimension of free-flowing particles) of about 1 mm to about 50 mm, or about 3 mm to about 15 mm, or less than or equal to 50 mm and greater than or equal to 1 mm, 2, 3, 4, 5, 6, 7, 8, 9, 10, 11, 12, 13, 14, 15, 16, 17, 18, 19, 20, 22, 24, 26, 28, 30, 32, 34, 36, 38, 40, 42, 44, 46, or 48 mm. The pre-clinker mixture and the resulting clinker can form a packed bed in the reaction chamber that moves downward at about the same speed as a combustion wave moves upward through the reaction chamber, resulting in an approximately stationary combustion wave. The pre-clinker mixture can be pelletized via any suitable process, such as agglomeration, briquetting, compaction and granulation, and/or extrusion pelletization. The pre-clinker mixture can be agglomerates or briquettes having a particle size of 1 about mm to about 50 mm, or about 3 mm to about 15 mm. The pre-clinker mixture particulates or particles can be agglomerated or briquetted from smaller particles (e.g., particles formed via grinding and/or pulverization), such as particles having a particle size of about 0.001 micron to about 100 microns, or about 1 micron to about 100 microns, or less than or equal to 100 microns and greater than or equal to 0.001 microns, 0.005, 0.01, 0.05, 0.1, 0.5, 1, 2, 3, 4, 5, 6, 8, 10, 12, 14, 16, 18, 20, 25, 30, 35, 40, 45, 50, 55, 60, 65, 70, 75, 80, 85, 90, or 95 microns. Pellets or briquettes can be held together via compaction (pressure), a binder, moisture, or a combination thereof. In various embodiments, the pellets can fill about 70% to about 100% of the reaction chamber of the vertical reactor. Pellets or briquettes can be any suitable shapes, such as spherical, ovoid, cubical, or other shapes, such as shapes with increased or optimized surface area and physical integrity. Increased surface area can increase the rate of heat transfer to the pellet or briquette.

Pre-clinker material can be preheated by gaseous products rising upward from gaseous combustion occurring therebelow in the reaction column. The preheating can be provided without application of any external heat source.

Forming the clinker from the pre-clinker mixture can include forming CaO from $CaCO_3$, with concomitant release of $CO_2$. Forming the clinker from the pre-clinker mixture can include forming products from the produced CaO and other materials in the pre-clinker mixture, such as (for example) forming $2CaO \cdot SiO_2$, $3CaO \cdot SiO_2$, $3CaO \cdot Al_2O_3$, $4CaO \cdot Al_2O_3 \cdot Fe_2O_3$, $CaO \cdot Al_2O_3$, $12CaO_7 \cdot Al_2O_3$, $2CaO \cdot Al_2O_3$, $4CaO_3 \cdot Al_2O_3SO_3$, or a combination thereof. Forming the clinker from the pre-clinker mixture can include calcination (e.g., release of $CO_2$), clinkerization (e.g., production of $2CaO \cdot SiO_2$, $3CaO \cdot SiO_2$, $3CaO \cdot Al_2O_3$, $4CaO \cdot Al_2O_3 \cdot Fe_2O_3$, CaO. $Al_2O_3$, $12Ca)_7 \cdot Al_2O_3$, $2CaO \cdot Al_2O_3$, $4CaO_3 \cdot Al_2O_3SO_3$, or a combination thereof), or a combination thereof. Clinker or phases thereof can include other oxides as impurities; for example, a $2CaO \cdot SiO_2$ phase can exist in the produced clinker or cement as $(2-x)CaO \cdot yMgO \cdot (1-z) SiO_2 \cdot mAl_2O_3 \cdot nFe_2O_3 \cdot pNa_2O \cdot qK_2O$, where x, y, z, m, n, p, q are 0 or significantly small integers. Such phases can also include other minor impurities such as (but not limited to) oxides of Ti, Mn, Cr, and Zn.

The heating of the pre-clinker mixture from the combustion to form the clinker therefrom can be performed at any suitable temperature such that the clinker is formed. For example, the heating can include heating the pre-clinker mixture to a temperature of 2282° F. (1250° C.) to 2732° F. (1500° C.), or 1472° F. (800° C.) to 3632° F. (2000° C.). In various aspects, the heating can be at or below 3632° F. (2000° C.), such as to accommodate various raw material mixtures and/or other processes.

A bottom portion of the vertical reactor can cool the clinker before the clinker is removed from the product exit port. The cooling of the clinker can include absorption of heat from the clinker by the pre-clinker mixture.

While flowing through the clinker cooling zone, the gaseous combustion mixture preheats up to its ignition temperature required to initiate combustion of the gaseous combustion mixture. The resulting combustion process is sufficient to generate the heat and to maintain the operating temperature required for the clinkering process. The heat released during the combustion and clinkering processes can move through the porous bed as a thermal wave enabling the combustion wave to move through the reaction chamber upwards at the same velocity and opposite direction as the porous bed's movement downwards from the top of the kiln to the discharge at the bottom of the kiln. From an observer's reference frame, the result can be a stationary combustion wave. The heat generated during fuel combustion and clinkering processes is utilized for the raw material preheating and calcination.

The combustion process can be initiated any suitable way. In one embodiment, the combustion mixture can be flowed through the porous media and ignited at one end of the reactor. The combustion mixture can then be adjusted to allow the combustion wave to enter the body of the reactor. In another embodiment, an external heat source can be used to preheat a section of the porous media to above the combustion mixture's autoignition temperature. The combustion mixture can then be flowed into the reactor to instigate combustion in the porous media. Once the reactor reaches a steady-state mode of operation, the method and apparatus can sustain combustion of the gaseous combustion material therein and clinker production from the pre-clinker starting material without application of external heat source.

The parameters of SAC including combustion zone/wave temperature and combustion wave propagation velocity can mainly be determined by the oxygen concentration in the oxidizer, oxidizer to fuel ratio (often expresses as the equivalence ratio $(A_v/F_v)_{stoic}/(A_v/F_v)_{act}$ where $(A_v/F_v)_{stoic}$—stochiometric oxidizer to fuel ratio (volume base) and $(A_V/F_V)_{act}$—actual oxidizer to fuel ratio (volume base)), filtration velocity $v_f$ of the combustion reactant mixture, or by the structure and thermal properties of the porous media (e.g., the starting material mixture or pre-clinker mixture), including media density, particle size, heat conductivity.

The equivalence ratio of the combustion mixture introduced at the bottom of the Super Adiabatic Kiln (SAK) can be maintained in 0.3-5 range and combustion wave is expected to travel at the velocity in 0.1-10 mm per minute range. Additional fuel and/or oxidizer can be introduced into a secondary region, also known as staged combustion, downstream of the clinkering process to provide additional heat for the calcination process if needed. The combustion in the secondary zone can be superadiabatic, or non-superadiabatic.

The shapes, maximum temperatures, and positions of the temperature profiles produced by the primary and secondary combustion waves can be optimized for efficient and high-quality clinker production. The combustion wave parameters and resulting temperature profiles can be effectively controlled by the air to fuels ratio, filtration velocity, oxidizer composition to compensate for variability in the raw material composition, and/or original size of the starting material mixture particles or pellets/briquettes. It is also possible to compensate for shrinkage due to the calcination process which results in changes in pellet density, pellet shape, pellet porosity, bulk density (packing density), and/or void space ratio.

The reaction chamber can include one combustion zone (e.g., combustion wave). In some aspects, the reaction chamber includes one and not more than one combustion wave, wherein calcination and clinkerization can occur in the same combustion wave. In some aspects, the reaction chamber includes two or more combustion waves. In one example, a reaction chamber with two combustion waves includes a first combustion wave including a calcination zone, and a second combustion wave including a clinkering zone. The second combustion wave can be below the first combustion wave. In various embodiments, the method includes maintaining the temperature at or below about 3632° F. (2000° C.). In some aspects, a calcination zone can have a temperature of about 1472° F. (800° C.) to about 2012° F. (1100° C.). In some aspects, a clinkering zone, or a combined calcination and clinkering zone, can have a temperature of about 2282° F. (1250° C.) to 2912° F. (1600° C.), or 2282° F. (1250° C.) to 3632° F. (2000° C.).

The reaction chamber can include a single combustion mixture inlet or multiple combustion mixture inlets. The gaseous combustion composition injected into each individual injection inlet can be a combination of fuel and oxidizer, or can be just fuel, or just oxidizer, so long as fuel and oxidizer combine within the column. In some aspects, the reaction chamber includes a combustion mixture inlet in a bottom portion of the reaction chamber and a combustion mixture inlet in a central portion of the reaction chamber. Multiple combustion mixture inlets can be used to control whether a single combustion wave or multiple combustion waves occur within the reaction chamber.

The method can include operating the vertical reactor in a batch mode. The method can include operating the vertical reactor in a continuous mode. In a batch mode, the reactor can be fully loaded with raw pellets of pre-clinker mixture, the combustion is initiated at the bottom of the reactor, the combustion wave travels from the bottom to the top of the bed of pellets thereby converting the starting material mixture to clinker, and then the clinker is discharged from the bottom of the reaction chamber. In a batch mode, the combustion wave moves through a stationary bed of the pre-clinker mixture.

In various aspects, a combustion wave is maintained as a stationary combustion wave as the pre-clinker mixture moves downwards through the reaction chamber. In other aspects, the propagation speed of one or more combustion waves can be individually controlled or shifted in unison. Individual control can result from changing parameters at more localized injection points (e.g., secondary injection, tertiary injection, and the like). Speeds can be shifted in unison by changing parameters at more global injection points (mainly the primary injection point). In general, speeds do exceed 20 mm/min. For the clinkerization process, speeds can range anywhere from 0.001 to 10 mm per minute, such as 0.1 mm to 10 mm per minute or 1 mm to 10 mm per minute.

The combustion waves can be oriented perpendicularly to a central vertical axis of the reaction chamber. In other aspects, the combustion waves can be tilted by locally changing propagation speed parameters.

The combustion waves can span the entire inner diameter of the reaction chamber. In some aspects, combustion wave or combustion wave can be smaller that the entire cross-sectional area of the reaction chamber, such as by localizing the combustion waves around fuel injection points so that the combustion occurs before the flammable gas is uniformly spread across the cross-sectional area.

Figure 1B:
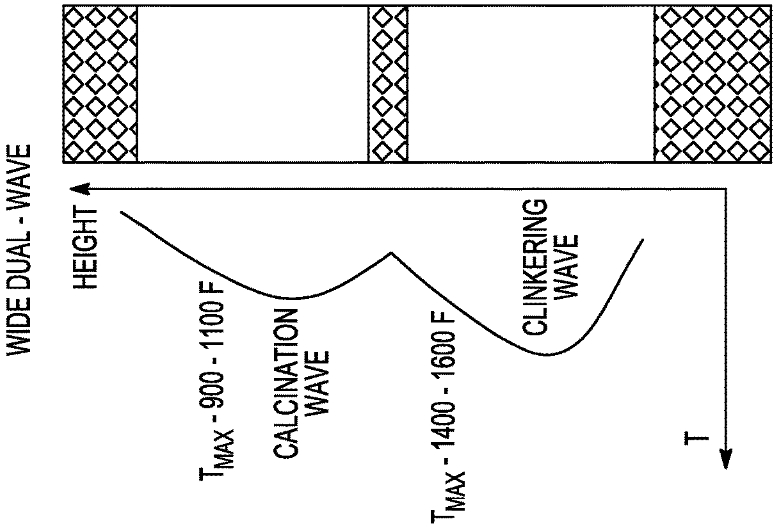
FIG. 1B illustrates a vertical reaction chamber that includes a calcination zone and a clinkering zone, in accordance with various aspects.
Figure 1C:
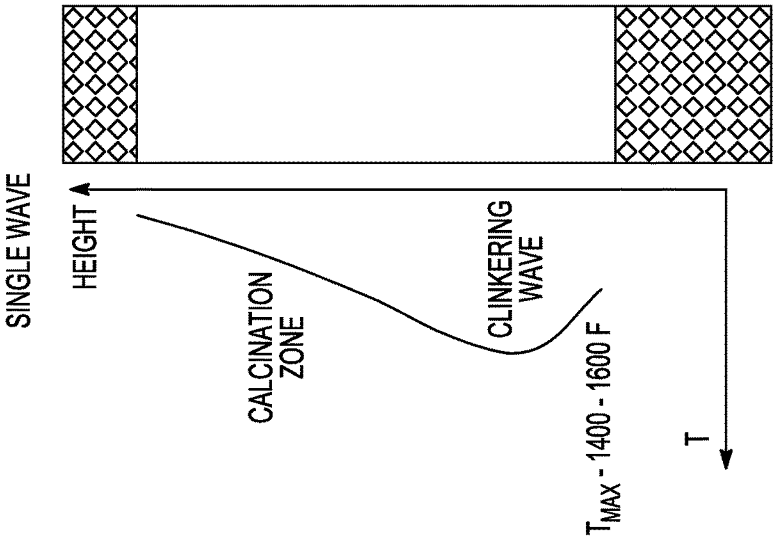
FIG. 1C illustrates a vertical reaction chamber that includes a single combustion wave, in accordance with various aspects.

FIG. 1A illustrates a vertical reaction chamber that includes a calcination zone and a clinkering zone, in accordance with various aspects. FIG. 1B illustrates a vertical reaction chamber that includes a calcination zone and a clinkering zone, in accordance with various aspects. FIG. 1C illustrates a vertical reaction chamber that includes a single combustion wave, in accordance with various aspects.

The method can include monitoring of the temperature and location of the combustion wave. The monitoring can include high resolution spectrometry (for applications >1700° C.) or the use of ceramic-sheathed thermocouples. Regardless of the method, temperature sensors oriented along the length of the kiln can be used to determine the maximum temperature and location of the combustion wave. Thermocouples oriented around the circumference of the kiln can be used to determine the angle of the combustion wave. Aspects of the present invention that include maintaining multiple combustion waves (e.g., separate waves are used to control calcining and clinkerization/sintering) can include locating and characterizing each combustion wave/zone.

Additional injection locations (e.g., for fuel, oxidizer, or both) can also be used to assist in the maintenance of the combustion wave. By introducing process gases at different locations, it is possible to: control the local equivalence ratio, stabilize the combustion wave and encourage uniform propagation of the wave through the material bed, and/or to form multiple combustion wavefronts.

For example, the first (upstream) wave can be run rich (with a high equivalence ratio). Secondary injection of oxidizer above (downstream) of the first wave can form a second wave with unreacted fuel. A similar effect can be achieved with a lean first wave and secondary injection of fuel. This process can be repeated for any number of combustion waves.

The manner in which process gases are introduced can also contribute to the control of the combustion wave. Variable velocity gas injection can be used to induce turbulence in the filtrating gases and encourage uniform mixing of the reactants. This effect can be compounded by injecting gases non-radially (off-center), thus creating a swirling effect within the reactor.

Examples of aspects of the present method that can improve or optimize raw material preheating, calcination, clinker burning, and/or cooling can include controlling: filtration velocity, firing rate, equivalence ratio, oxygen concentration in oxidizer, secondary air and fuel injection, raw material feeding rate, raw material pellet size and thermophysical properties, and/or raw material composition and preparation process.

In various aspects, the method of producing clinker can operate at an efficiency of 50% to 95%, or 65% to 90%, or less than or equal to 95% and greater than or equal to 50% and less than, equal to, or greater than 52%, 54, 56, 58, 60, 62, 64, 66, 67, 68, 69, 70, 71, 72, 73, 74, 76, 78, 79, 80, 81, 82, 83, 84, 85, 86, 88, 90, 92, or 94%. The method can be performed using an equivalence ratio of fuel/air in the gaseous combustion mixture of 0.1 to 0.9, or 0.5 to or less than or equal to 1 and greater than or equal to 0 and less than, equal to, or greater than 0.2, 0.3, 0.4, 0.5, 0.55, 0.6, 0.65, 0.7, 0.75, 0.8, 0.85, 0.9, or 0.95. The method can be performed using a suitable velocity of the gaseous combustion mixture relative to walls of the reactor, such as 0.1 m/s to 20 m/s, or 0.4 m/s to 5 m/s, or 0.5 m/s to 2.5 m/s, or less than or equal to 20 m/s and greater than or equal to 0.1 m/s and less than, equal to, or greater than 0.5, 1, 1.5, 2, 2.5, 3, 4, 5, 6, 7, 8, 9, 10, 12, 14, 16, or 18 m/s.

Method of Producing Other Materials.

In various aspects, the present invention provides a method of producing a product. The method can include placing a starting material mixture into a starting material feed port in a reaction chamber of a vertical reactor. The vertical reactor can include a product exit port in the reaction chamber (e.g., at a bottom portion of the reaction chamber), a gaseous combustion mixture inlet into the reaction chamber, and one or more gas exhaust ports in the reaction chamber (e.g., at the top portion of the reaction chamber). The method can include placing a gaseous combustion mixture into the gaseous combustion mixture inlet. The method can include combusting the gaseous combustion mixture within the vertical reactor to heat the starting material mixture and form the product therefrom. The method also can include removing the product from the product exit port.

The method can be a method of cement production (e.g., production of clinker from pre-clinker mixture, as described above), or a method of calcining a source of CaO (e.g., $CaCO_3$, or any source of CaO described herein) to produce lime, calcination for desorbing $CO_2$ from any carbonate rock (e.g., limestone) in a direct air capture system, sintering of refractory materials, lithium production via spodumene, or direction reduction iron processing.

Apparatus.

Various aspects of the present invention provide an apparatus for performing the method of the present invention. The apparatus can be any suitable apparatus that can perform the method. For example, the apparatus can include a vertically-oriented reaction chamber. The apparatus can include a starting material feed port in the reaction chamber. The starting material feed port can be located at a top portion of the reaction chamber, or in another suitable portion of the reaction chamber. The apparatus can include a gaseous combustion mixture inlet into the reaction chamber for injecting the gaseous combustion mixture therein.

The apparatus can be an apparatus for producing clinker from a pre-clinker mixture, wherein the apparatus is configured to combust the gaseous combustion mixture within the vertical reactor to heat the pre-clinker mixture, release CO 2 therefrom, and form the clinker therefrom. The apparatus can be an apparatus for calcining a source of CaO (e.g., $CaCO_3$) to produce lime, calcination for desorbing $CO_2$ from carbonate (e.g., limestone) in a direct air capture system, sintering of refractory materials, lithium production via spodumene, or direction reduction iron processing.

Figure 2:
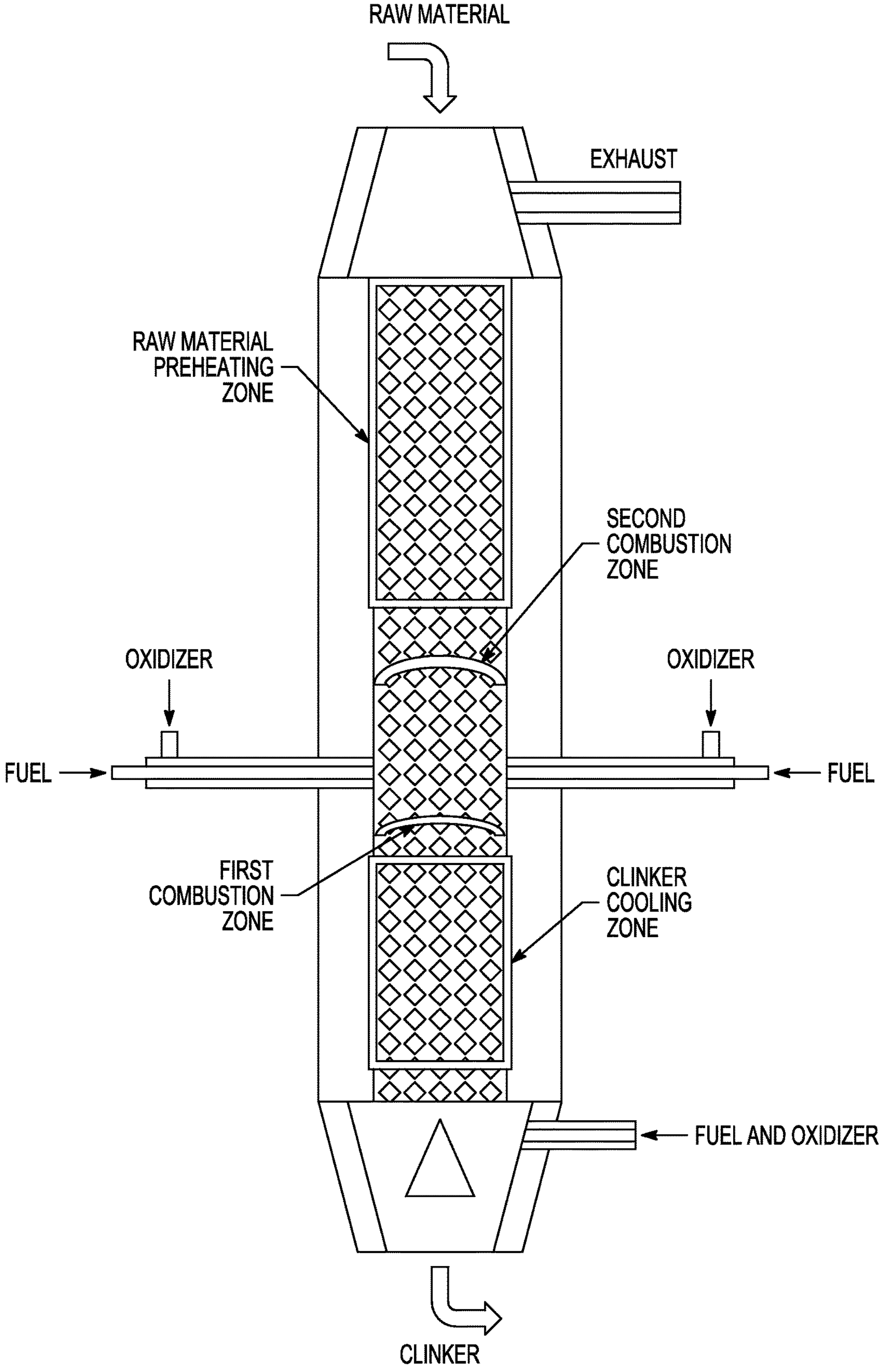
FIG. 2 illustrates an apparatus for producing clinker, in accordance with various aspects.

FIG. 2 illustrates an apparatus for producing clinker, in accordance with various aspects.

EXAMPLES

Various embodiments of the present invention can be better understood by reference to the following Examples which are offered by way of illustration. The present invention is not limited to the Examples given herein.

Example 1. Benchtop Scale Reactor

A benchtop scale reactor was used that utilized sub-adiabatic filtration combustion with methane as a fuel and air as an oxidizer. The benchtop reactor had the design shown in FIG. 2.

During the test, a maximum temperature of 1,568° C. was achieved. X-ray diffraction (XRD) analysis was conducted on the product to confirm production of commercial-quality clinker comparable to that produced by traditional rotary kilns. Table 1 illustrates the phase distribution of the produced clinker.

TABLE 1

Phase distribution of clinker. OPC means Ordinary Portland Cement.

| Phase | Typical Type I/II OPC clinker | Example 1 clinker |
|---|---|---|
| C3S | 50 to 70% | 67% |
| C2S | 10 to 25% | 9.3% |
| C3A | <10% | 3.3% |
| C4AF | <15% | 10.4% |

Example 2. Efficiency Simulation

Based on both the benchtop scale testing conducted in Example 1, and other lab scale testing that has been conducted, estimates for the efficiency of the reactor shown in FIG. 2 can be made.

Figure 3:
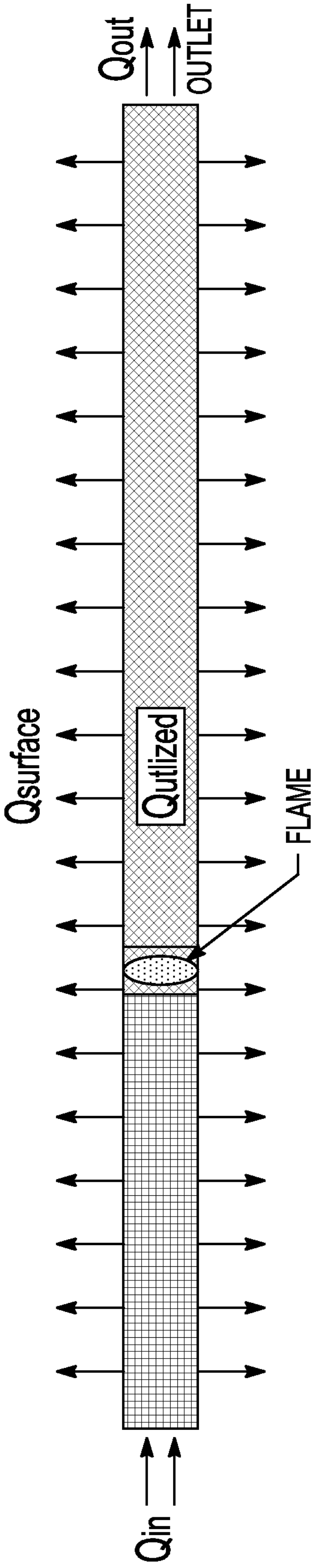
FIG. 3 illustrates a diagram of a reaction chamber filled with a porous media, in accordance with various aspects.
Figure 4:
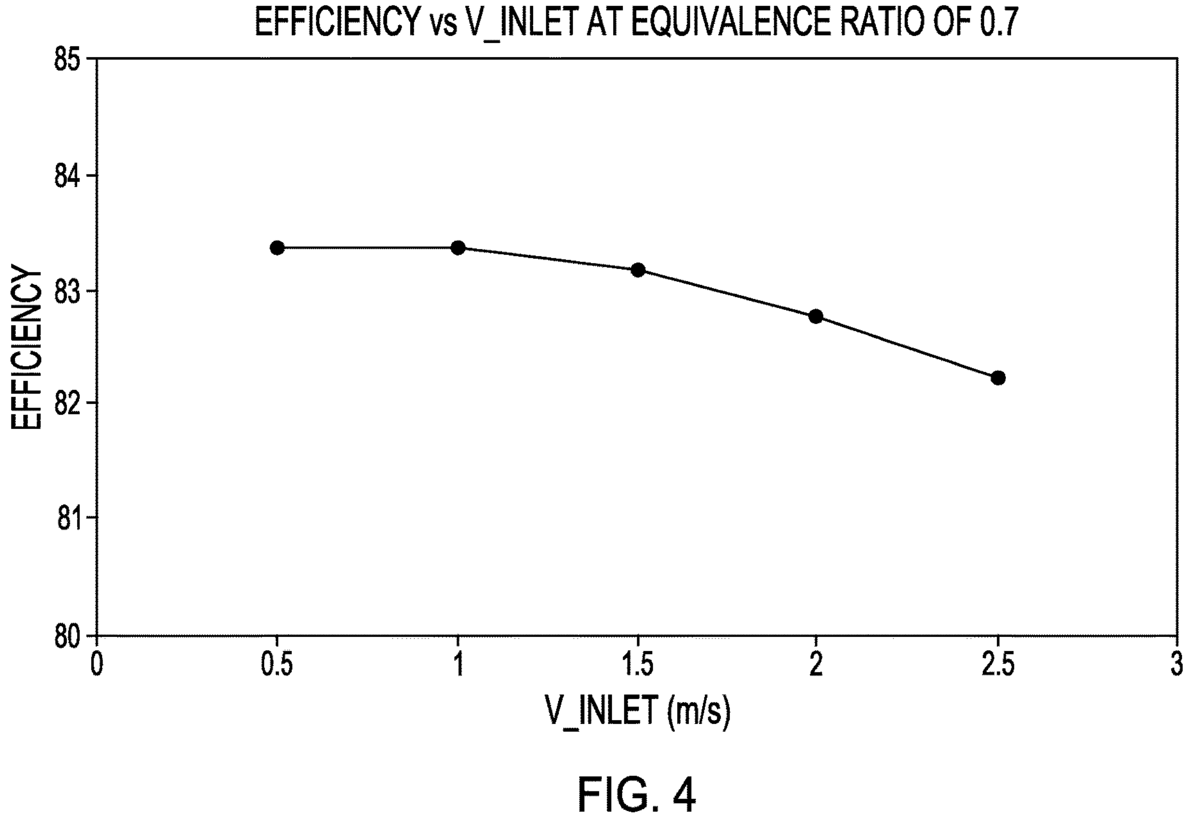
FIG. 4 illustrates efficiency versus V_inlet at an equivalence ratio of 0.7 for a simulated reactor, in accordance with various aspects.
Figure 5:
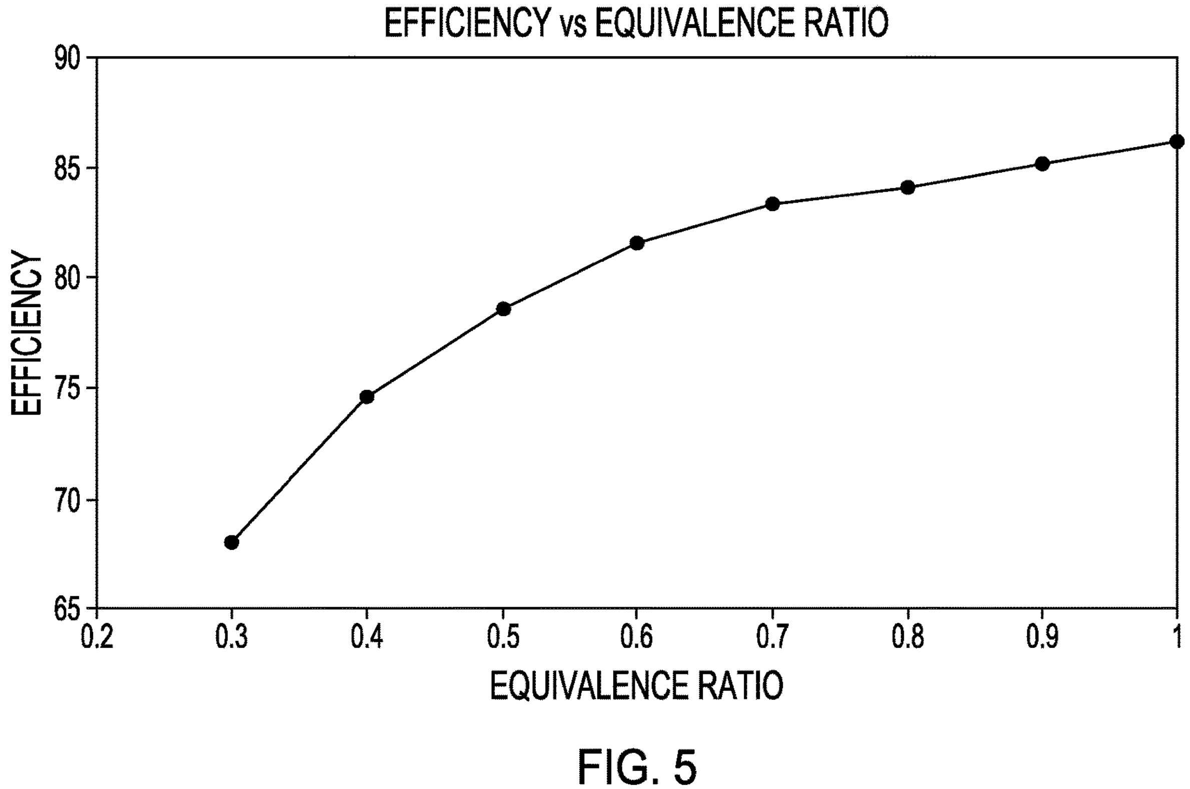
FIG. 5 illustrates efficiency versus equivalence ratio for a simulated reactor at a V-inlet of 0.5 m/s, in accordance with various aspects.

As shown in the diagram of FIG. 3, premixed fuel-air mixture enters a reaction chamber filled with porous media and preheats until it reaches its ignition temperature. Q_in, the energy of the incoming fuel mixture, is equal to Q_utilized+Q_surface+Q_out, wherein Q_surface is the energy lost from the surface of the reactor to ambient. Q_out is the energy lost to ambient through hot exhaust, and Q_utilized is the energy consumed by the clinkering reaction. Efficiency is equal to Q_utilized/Q_in. The following assumptions are made in the simulation: (1) thermodynamic properties of the fuel-air mixture and combustion products are functions of temperature and concentration; (2) thermal equilibrium exists between the gas and the solid phase; (3) pressure drop across the flame is negligible; (4) the pellets comprising the porous media are homogeneously distributed; (5) the flow is one dimensional and incompressible; (6) the gaseous radiation is negligible as compared to solid radiation; (7) the pellets comprising the porous media are non-catalytic. FIG. 4 illustrates efficiency versus V_inlet, which is the velocity of the gas relative to the walls of the reactor, at a constant equivalence ratio of fuel/air of 0.7. The V_inlet is directly proportional to the total volume of gas divided by the cross-sectional area of the reactor. Approximately 82-83.5% efficiency is predicted. FIG. 5 illustrates efficiency versus equivalence ratio at a constant V_inlet of 0.5 m/s, predicting efficiencies of about 68% to 86%.

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present invention. Thus, it should be understood that although the present invention has been specifically disclosed by specific aspects and optional features, modification and variation of the concepts herein disclosed may be resorted to by those of ordinary skill in the art, and that such modifications and variations are considered to be within the scope of aspects of the present invention.

Exemplary Aspects.

The following exemplary aspects are provided, the numbering of which is not to be construed as designating levels of importance:

Aspect 1 provides a method of producing clinker, the method comprising:

placing a pre-clinker mixture comprising a source of CaO (e.g., wherein the source of CaO comprises $CaCO_3$) into a starting material feed port in a vertically-oriented reaction chamber of a vertical reaction (e.g., at a top portion the reaction chamber of a vertical reactor), wherein the vertical reactor comprises
 - a product exit port in the reaction chamber (e.g., at a bottom portion of the reaction chamber),
 - a gaseous combustion mixture inlet into the reaction chamber, and
 - one or more gas exhaust ports in the reaction chamber (e.g., at the top portion of the reaction chamber);

placing a gaseous combustion mixture into the gaseous combustion mixture inlet;

combusting the gaseous combustion mixture within the vertical reactor to heat the pre-clinker mixture, release $CO_2$ therefrom, and form the clinker therefrom;

removing the clinker from the product exit port.

Aspect 2 provides the method of Aspect 1, wherein the method is free of external application of heat to the reaction chamber.

Aspect 3 provides the method of any one of Aspects 1-2, wherein the combustion of the gaseous combustion mixture is superadiabatic combustion, and wherein the superadiabatic combustion is self-sustaining (i.e., in the absence of external heat applied to the reaction chamber).

Aspect 4 provides the method of any one of Aspects 1-3, wherein combustion occurs on and/or in the pre-clinker mixture.

Aspect 5 provides the method of any one of Aspects 1-4, wherein the combustion of the gaseous combustion mixture is non-superadiabatic combustion, and wherein the non-superadiabatic combustion is self-sustaining (i.e., in the absence of external heat applied to the reaction chamber).

Aspect 6 provides the method of any one of Aspects 1-5, wherein the pre-clinker mixture further comprises $SiO_2$, $Al_2O_3$, $Fe_2O_3$, $SO_3$, MgO, $P_2O_5$, or a combination thereof.

Aspect 7 provides the method of any one of Aspects 1-6, wherein the gaseous combustion mixture comprises a $C_1$-$C_5$ hydrocarbon, $H_2$, $O_2$, $N_2$, $CO_2$, CO, or a combination thereof.

Aspect 8 provides the method of Aspect 7, wherein the gaseous combustion mixture comprises $N_2$, $CO_2$, $O_2$, or a combination thereof.

Aspect 9 provides the method of any one of Aspects 1-8, wherein the gaseous combustion mixture comprises biogas, syngas, or a combination thereof.

Aspect 10 provides the method of any one of Aspects 1-9, wherein the gaseous combustion mixture comprises air, oxygen-enriched air, synthetic air, oxygen-depleted synthetic air, oxygen-enriched synthetic air, or a combination thereof.

Aspect 11 provides the method of any one of Aspects 1-10, wherein the pre-clinker mixture is particulate and comprises a largest dimension of about 1 mm to about 50 mm.

Aspect 12 provides the method of any one of Aspects 11, wherein the pre-clinker mixture comprises a largest dimension of about 3 mm to about 15 mm.

Aspect 13 provides the method of any one of Aspects 1-12, wherein pre-clinker mixture in the reaction chamber is preheated from heat from gaseous products resulting from combustion in a lower portion of the reaction chamber.

Aspect 14 provides the method of Aspect 13, wherein the preheating is provided without application of any external heat source.

Aspect 15 provides the method of any one of Aspects 1-14, wherein forming the clinker from the pre-clinker mixture comprises forming CaO from the source of $CaCO_3$ (e.g., limestone (such as inorganic or fossiliferous sedimentary limestone, metamorphic and igneous carbonate rock), calcium silicate mineral (such as wollastonite), and/or calcium aluminosilicates (such as slag or anorthite)). Forming the CaO from the source of CaO can include forming a calcined intermediate product prior to forming clinker.

Aspect 16 provides the method of any one of Aspects 1-15, wherein the forming the clinker from the pre-clinker mixture comprises forming $2CaO{\cdot}SiO_2$, $3CaO{\cdot}SiO_2$, $3CaO{\cdot}Al_2O_3$, $4CaO{\cdot}Al_2O_3{\cdot}Fe_2O_3$, $CaO{\cdot}Al_2O_3$, $12CaO_7{\cdot}Al_2O_3$, $2CaO{\cdot}Al_2O_3$, $4CaO_3{\cdot}Al_2O_3SO_3$, or a combination thereof.

Aspect 17 provides the method of any one of Aspects 1-16, wherein forming the clinker from the pre-clinker mixture comprises calcination, clinkerization, sintering, or a combination thereof.

Aspect 18 provides the method of any one of Aspects 1-17, wherein the gas combustion mixture coolers clinker in a bottom portion of the vertical reactor before the clinker is removed from the product exit port.

Aspect 19 provides the method of Aspect 18, wherein the cooling of the clinker comprises absorption of heat from the clinker by the pre-clinker mixture.

Aspect 20 provides the method of any one of Aspects 1-19, wherein heating the pre-clinker mixture to form the clinker therefrom comprises heating the pre-clinker mixture to a temperature of 1472° F. (800° C.) to 3632° F. (2000° C.).

Aspect 21 provides the method of any one of Aspects 1-20, wherein heating the pre-clinker mixture to form the clinker therefrom comprises heating the pre-clinker mixture to a temperature of 2282° F. (1250° C.) to 2732° F. (1500° C.).

Aspect 22 provides the method of any one of Aspects 1-21, wherein the reaction chamber comprises a single combustion wave.

Aspect 23 provides the method of Aspect 22, wherein the reaction chamber has no more than a single combustion wave.

Aspect 24 provides the method of any one of Aspects 1-21, wherein the reaction chamber comprises two or more combustion waves.

Aspect 25 provides the method of any one of Aspects 1-24, wherein the reaction chamber comprises two combustion waves, with a first combustion wave comprising a calcination zone, and with the second combustion wave comprising a clinkering zone, wherein the second combustion wave is below the first combustion wave.

Aspect 26 provides the method of any one of Aspects 1-25, wherein the reaction chamber comprises multiple gaseous combustion mixture inlets, wherein the method comprises injecting the gaseous combustion mixture into each of the gaseous combustion mixture inlets.

Aspect 27 provides the method of any one of Aspects 1-26, comprising operating the vertical reactor in a batch mode.

Aspect 28 provides the method of any one of Aspects 1-26, comprising operating the vertical reactor in a continuous mode.

Aspect 29 provides a method of producing a product, the method comprising:

placing a starting material mixture into a starting material feed port in a vertically-oriented reaction chamber of a vertical reactor (e.g., in a top portion of the reaction chamber), wherein the vertical reactor comprises a product exit port in the reaction chamber (e.g., at a bottom portion of the reaction chamber), a gaseous combustion mixture inlet into the reaction chamber, and one or more gas exhaust ports in the reaction chamber (e.g., at the top portion of the reaction chamber);

placing a gaseous combustion mixture into the gaseous combustion mixture inlet;

combusting the gaseous combustion mixture within the vertical reactor to heat the starting material mixture and form the product therefrom;

removing the product from the product exit port.

Aspect 30 provides the method of Aspect 29, wherein the method is a method of cement production, calcining a source of CaO (e.g., $CaCO_3$) to produce lime, calcination for desorbing $CO_2$ from carbonate (e.g., limestone) in a direct air capture system, sintering of refractory materials, lithium production via spodumene, or direction reduction iron processing Aspect 31 provides an apparatus comprising:

a vertically-oriented reaction chamber;

a starting material feed port in the reaction chamber (e.g., at a top portion of the reaction chamber); and a gaseous combustion mixture inlet into the reaction chamber for injecting a gaseous combustion mixture therein.

Aspect 32 provides the apparatus of Aspect 31, wherein the apparatus further comprises one or more gas exhaust ports at the top portion of the reaction chamber.

Aspect 33 provides the apparatus of any one of Aspects 31-32, wherein the apparatus is for producing clinker, wherein the apparatus is configured to combust the gaseous combustion mixture within the vertical reactor to heat the pre-clinker mixture, release $CO_2$ therefrom, and form the clinker therefrom.

Aspect 34 provides the method or apparatus of any one or any combination of Aspects 1-33 optionally configured such that all elements or options recited are available to use or select from.

What is claimed is:

1. A method of producing clinker, the method comprising:

placing a pre-clinker mixture comprising a source of CaO into a starting material feed port in a vertical reactor, wherein the vertical reactor comprises:

a vertically-oriented longitudinal axis of the reaction chamber, a product exit port, an inlet into the reaction chamber, and one or more gas exhaust ports;

placing a gaseous combustion mixture into the inlet;

performing filtration combustion of the gaseous combustion mixture within spaces of a porous matrix formed by the pre-clinker mixture to heat the pre-clinker mixture, release $CO_2$ therefrom, and form the clinker therefrom; and removing the clinker from the product exit port.

2. The method of claim 1, wherein the vertically-oriented longitudinal axis of the reaction chamber forms an angle of 45° to 90° with a horizontal axis.

3. The method of claim 1, wherein the starting material feed port is located at a top portion of the reaction chamber, the one or more gas exhaust ports are located at the top portion of the reaction chamber, and wherein the product exit port is located at a bottom portion of the reaction chamber.

4. The method of claim 1, wherein the source of CaO comprises $CaCO_3$, limestone, calcium silicate mineral, and/or a calcium aluminosilicate.

5. The method of claim 1, wherein the pre-clinker mixture further comprises $SiO_2$, $Al_2O_3$, $Fe_2O_3$, $SO_3$, MgO, $P_2O_5$, or a combination thereof.

6. The method of claim 1, wherein the gaseous combustion mixture comprises a $C_1$-$C_5$ hydrocarbon, $H_2$, $O_2$, $N_2$, $CO_2$, CO, oxygen-enriched air, synthetic air, oxygen-depleted synthetic air, oxygen-enriched synthetic air, biogas, syngas, or a combination thereof.

7. The method of claim 1, wherein the pre-clinker mixture is particulate, is pelletized, and or is briquetted, and comprises a largest dimension of about 1 mm to about 50 mm.

8. The method of claim 1, wherein the pre-clinker mixture in the reaction chamber is preheated from heat from gaseous products resulting from combustion in a lower portion of the reaction chamber.

9. The method of claim 1, wherein forming the clinker from the pre-clinker mixture comprises forming CaO from the source of CaO.

10. The method of claim 1, wherein the forming the clinker from the pre-clinker mixture comprises forming $2CaO\cdot SiO_2$, $3CaO\cdot SiO_2$, $3CaO\cdot Al_2O_3$, $4CaO\cdot Al_2O_3\cdot Fe_2O_3$, $CaO\cdot Al_2O_3$, $12CaO_7\cdot Al_2O_3$, $2CaO\cdot Al_2O_3$, $4CaO_3\cdot Al_2O_3SO_3$, or a combination thereof.

11. The method of claim 1, wherein the gaseous combustion mixture cools the clinker before the clinker is removed from the product exit port.

12. The method of claim 1, wherein heating the pre-clinker mixture to form the clinker therefrom comprises heating the pre-clinker mixture to a temperature of 1472° F. (800° C.) to 3632° F. (2000° C.).

13. The method of claim 1, wherein heating the pre-clinker mixture to form the clinker therefrom comprises heating the pre-clinker mixture to a temperature of 2282° F. (1250° C.) to 2732° F. (1500° C.).

14. The method of claim 1, wherein the reaction chamber comprises a single combustion wave.

15. The method of claim 1, wherein the reaction chamber comprises two or more combustion waves.

16. The method of claim 1, wherein the reaction chamber comprises multiple inlets, wherein the method comprises injecting the gaseous combustion mixture into each of the inlets.

* * * * *